United States Patent
Hunt et al.

(10) Patent No.: US 12,554,814 B2
(45) Date of Patent: Feb. 17, 2026

(54) AUTHORIZATION USING AN OPTICAL SENSOR

(71) Applicant: Telefonaktiebolaget LM Ericsson (publ), Stockholm (SE)

(72) Inventors: Alexander Hunt, Tygelsjö (SE); Andreas Kristensson, Södra Sandby (SE); Fredrik Dahlgren, Lund (SE); Magnus Olsson, Klagshamn (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 556 days.

(21) Appl. No.: 17/928,682

(22) PCT Filed: Jun. 11, 2020

(86) PCT No.: PCT/EP2020/066236
§ 371 (c)(1),
(2) Date: Jul. 29, 2023

(87) PCT Pub. No.: WO2021/249649
PCT Pub. Date: Dec. 16, 2021

(65) Prior Publication Data
US 2023/0297654 A1    Sep. 21, 2023

(51) Int. Cl.
*G06F 21/32*    (2013.01)
*G06V 10/141*    (2022.01)
(Continued)

(52) U.S. Cl.
CPC ............ *G06F 21/32* (2013.01); *G06V 10/141* (2022.01); *G06V 10/761* (2022.01); *G06V 40/172* (2022.01); *G06V 30/2552* (2022.01)

(58) Field of Classification Search
CPC .... G06F 21/32; G06V 10/141; G06V 10/761; G06V 40/172
See application file for complete search history.

(56) References Cited

U.S. PATENT DOCUMENTS 11,605,240 B1    3/2023    Wei et al.
2007/0083936 A1    4/2007    Booth et al.
(Continued)

FOREIGN PATENT DOCUMENTS

EP    3502954 A1    6/2019

OTHER PUBLICATIONS

PCT International Search Report, mailed Mar. 1, 2021, in connection with International Application No. PCT/EP2020/066236, all pages.
(Continued)

*Primary Examiner* — Clayton R Williams
(74) *Attorney, Agent, or Firm* — Weisberg I.P. Law, P.A.

(57) ABSTRACT

A method of authorizing a device action includes accessing a first baseline model that represents image characteristics of an authorized first user or object. The first baseline model is used as a basis for selecting a first number of sensing structures of a camera image sensor, wherein the first number of sensing structures of the camera image sensor is less than a total number of sensing structures of the camera image sensor. The selected first number of sensing structures of the camera image sensor is activated and a first image sensed by the activated first number of sensing structures is obtaining. The first image is compared with the first baseline model. A next round of authorization processing is activated when an amount of correlation between the first image and the first baseline model satisfies a threshold correlation amount.

22 Claims, 10 Drawing Sheets

(51) Int. Cl.
   *G06V 10/74* (2022.01)
   *G06V 30/24* (2022.01)
   *G06V 40/16* (2022.01)

(56) References Cited

U.S. PATENT DOCUMENTS

| | | | |
|---|---|---|---|
| 2007/0140532 A1* | 6/2007 | Goffin | H04N 7/14 382/118 |
| 2009/0041308 A1* | 2/2009 | Chang | G06F 21/32 382/117 |
| 2011/0134251 A1 | 6/2011 | Kim et al. | |
| 2013/0108107 A1 | 5/2013 | Kang et al. | |
| 2014/0009648 A1 | 1/2014 | Kim et al. | |
| 2016/0094814 A1* | 3/2016 | Gousev | G06V 40/23 348/143 |
| 2019/0087690 A1 | 3/2019 | Srivastava | |
| 2020/0034619 A1* | 1/2020 | Gibbon | G06T 7/70 |
| 2021/0185264 A1 | 6/2021 | Wong | |
| 2021/0337097 A1 | 10/2021 | Hunt et al. | |
| 2022/0116565 A1 | 4/2022 | Tsai et al. | |
| 2023/0025549 A1 | 1/2023 | Segura Puchades | |

OTHER PUBLICATIONS

PCT Written Opinion, mailed Mar. 1, 2021, in connection with International Application No. PCT/EP2020/066236, all pages.
PCT International Search Report, mailed Jul. 22, 2021, in connection with International Application No. PCT/EP2020/082734, all pages.
PCT Written Opinion, mailed Jul. 22, 2021, in connection with International Application No. PCT/EP2020/082734, all pages.
Posch, C. et al., "An Asynchronous Time-based Image Sensor", Circuits and Systems, IEEE International Symposium, Piscataway, NJ, USA, May 18, 2008, pp. 2130-2133.
Lichsteiner, P. et al., "A 128x 128 120 dB15 US latency asynchronous temporal contrast vision sensor", IEEE Journal of Solid State Circuits, vol. 43, No. 2, Feb. 2008, 13 pages.
Tedaldi, D. et al., "Feature Detection and Tracking with the Dynamic and Active-pixel Vision Sensor (DAVIS)", downloaded Sep. 1, 2020 from IEEE Xplore, 7 pages.
Kumagai, O. et al., "A 1/4-inch 3.9Mpixel Low-Power Event-Driven Back-Illuminated Stacked CMOS Image Sensor", ISSCC 2018 / Session 5 / Image Sensors / 5.4, 2018 IEEE International Solid-State Circuits Conference, Feb. 12, 2018, 3 pages.
Choo, K.D. et al., "Energy-Efficient Low-Noise CMOS Image Sensor with Capacitor Array-Assisted Charge-Injection SAR ADC for Motion-Triggered Low-Power lot Applications", ISCC 2019 / Session 5 / Image Sensors / 5.2, 2019 IEEE International Solid-State Circuits Conference, Feb. 18, 2019, 3 pages.
Fossum, E.R. et al., "A 37x28mm 600k-Pixel CMOS APS Dental X-Ray Camera-on-a-Chip with Self-Triggered Readout", ISSCC98 / Session 11 / Image Sensors / Paper FA 11.3, Feb. 6, 1998, 2 pages.
Delbruckl, T., "Neuromorphic Vision Sensing and Processing", 2016 IEEE, downloaded Sep. 1, 2020 from EEE Xplore, 8 pages.
Neftci, E. et al., "State-dependent sensory processing in networks of VLSI spiking neurons", 2010 IEEE, downloaded Sep. 1, 2020 from IEEE Xplore, 4 pages.
Ex Parte Quayle Action issued Sep. 9, 2024 in connection with U.S. Appl. No. 18/033,844, 18 pages.
India Office Action issued May 5, 2025 in connection with IN Application No. 202317000622, 6 pages.
Notice of Allowance issued Dec. 19, 2024 in connection with U.S. Appl. No. 18/033,844, 10 pages.

* cited by examiner

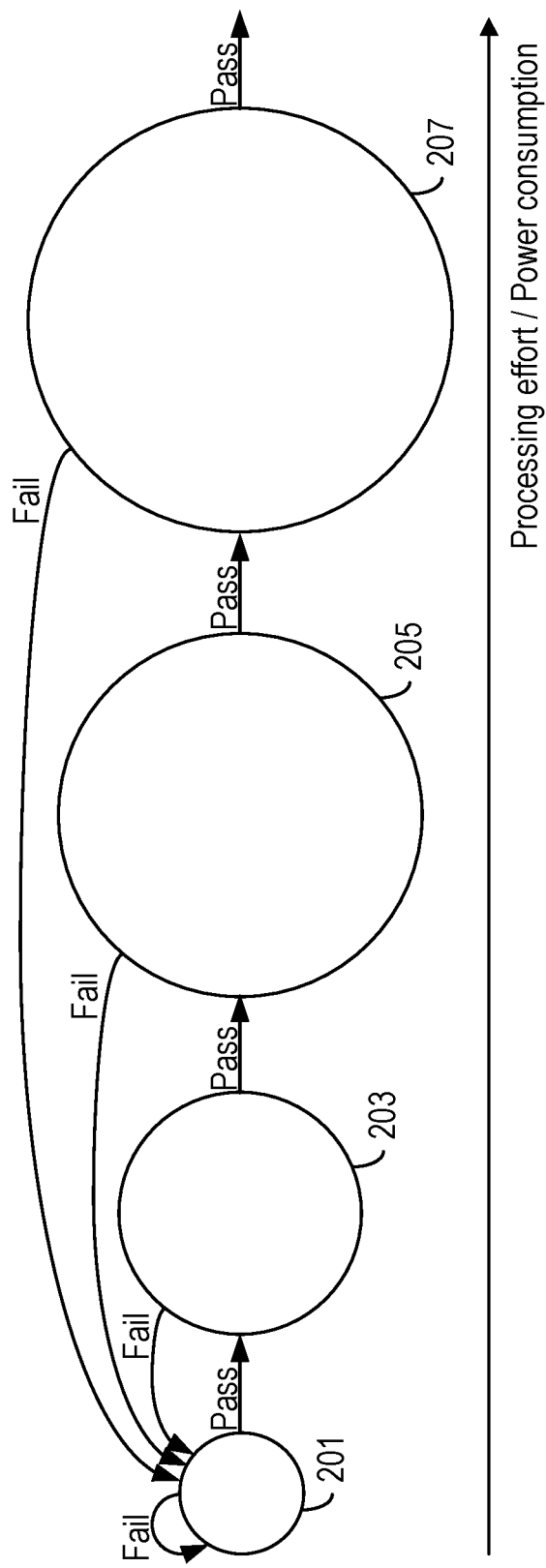

AUTHORIZATION USING AN OPTICAL SENSOR

BACKGROUND

The present invention relates to technology for detecting and identifying objects (including living and inanimate), more particularly to technology that uses optical sensing to perform these tasks, and even more particularly to energy-efficient use of optical sensing to perform these tasks.

There presently are technologies for detecting and identifying objects. (As used herein, the word "object" is used in its most general sense to refer to both animate and inanimate objects; for example, a name tag and a person's face are both considered to be "objects".) In conventional technology, a camera can be used in combination with a trained neural network to perform object detection. Object detection to find persons and faces together with identification of a person can be used to easily unlock items, devices and the like.

There also presently exists technology that makes it possible to open one's car, house door, and the like without using a key, but such technology requires that a person possess a personal token (either tangible or intangible) that is used for authenticating identity. Examples of such tokens include, without limitation, a Near Field Communication (NFC) tag, a personal identification code, and wireless secure identification, such as wireless car keys that are commonly used today.

All of the technologies described above are known and commonly used. However, each type has associated problems. For example, technology that relies on object detection and person identification require very power consuming processing and hence are not suitable in an always-on scenario in which there is a power budget on the device.

And as for the use of a token for identification, such a solution has a problem in that it can be lost (or forgotten). A physical token also can become useless if its communication means are breached because it can no longer be trusted. It would then need to be reprogrammed or replaced.

There is therefore a need for technology that addresses the above and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that authorizes device action. This includes accessing a first baseline model that represents image characteristics of an authorized first user or object and using the first baseline model as a basis for selecting a first number of sensing structures of a camera image sensor, wherein the first number of sensing structures of the camera image sensor is less than a total number of sensing structures of the camera image sensor. The selected first number of sensing structures of the camera image sensor is activated and a first image sensed by the activated first number of sensing structures is obtaining therefrom. The first image is compared with the first baseline model and a next round of authorization processing is activated when an amount of correlation between the first image and the first baseline model satisfies a threshold correlation amount.

In another aspect of some but not necessarily all embodiments consistent with the invention, authorizing device action further comprises activating a second number of sensing structures of the camera image sensor when the amount of correlation between the first image and the first baseline model satisfies the threshold correlation amount, wherein the second number of sensing structures of the camera image sensor is greater than the first number of sensing structures of the camera image sensor; and wherein the next round of authorization processing uses the activated second number of sensing structures of the camera image sensor.

In another aspect of some but not necessarily all embodiments consistent with the invention, each one of the total number of sensing structures of the camera image sensor is a pixel element.

In another aspect of some but not necessarily all embodiments consistent with the invention, each one of the total number of sensing structures of the camera image sensor is a line of pixel elements.

In another aspect of some but not necessarily all embodiments consistent with the invention, of the sensing structures of the camera image sensor is a monochromatic sensing line.

In another aspect of some but not necessarily all embodiments consistent with the invention, authorizing device action further comprises using the first baseline model as a basis for deciding which ones of the total number of sensing structures of the camera image sensor will be selected as the first number of sensing structures.

In another aspect of some but not necessarily all embodiments consistent with the invention, a first subset of the first number of sensing structures is able to sense only a first color of light, and a second subset of the first number of sensing structures is able to sense only a second color of light that is different from the first color of light.

In another aspect of some but not necessarily all embodiments consistent with the invention, authorizing device action further comprises, when the amount of correlation between the first image and the first baseline model does not satisfy the threshold correlation amount, accessing a second baseline model that represents image characteristics of an authorized second user or object. The second baseline model is used as a basis for selecting a third number of sensing structures of the camera image sensor, wherein the third number of sensing structures of the camera image sensor is less than the total number of sensing structures of the camera image sensor. The selected third number of sensing structures of the camera image sensor is activated and a second image sensed by the activated second number of sensing structures is obtained therefrom. The second image is compared with the second baseline model. The next round of authorization processing is activated when an amount of correlation between the second image and the second baseline model satisfies the threshold correlation amount.

In another aspect of some but not necessarily all embodiments consistent with the invention, authorizing device action further comprises accessing a third baseline model that represents image characteristics of a background that is sensed when no authorized user or object is present. The third baseline model is used as a basis for selecting a fourth number of sensing structures of the camera image sensor, wherein the fourth number of sensing structures of the camera image sensor is less than the total number of sensing structures of the camera image sensor. The fourth number of sensing structures of the camera image sensor is activated and a third image sensed by the activated third number of sensing structures is obtained therefrom. The third image is compared with the third baseline model. Activation of the next round of authorization processing that uses the activated second number of sensing structures occurs when an amount of correlation between the third image and the second baseline model does not satisfy the threshold correlation amount.

In another aspect of some but not necessarily all embodiments consistent with the invention, the device action is one of:
   locking a device;
   unlocking the device;
   starting a device; and
   stopping a device.

In another aspect of some but not necessarily all embodiments consistent with the invention, authorizing device action further comprises triggering performance of the device action when the next round of authorization processing concludes that the amount of correlation between the first image and the first baseline model satisfies the threshold correlation amount.

In another aspect of some but not necessarily all embodiments, an electronic device is configured to carry out any one or more of the above-described aspects.

The electronic device can be, for example, an authorization device or a locking device.

In another aspect of some but not necessarily all embodiments consistent with the invention, the electronic device is a mobile communication device.

BRIEF DESCRIPTION OF THE DRAWINGS

The objects and advantages of the invention will be understood by reading the following detailed description in conjunction with the drawings in which:

FIG. 2 is a schematic/state diagram illustrating the concept of a multi-stage authorization/activation process.

DETAILED DESCRIPTION

Figure 1A:
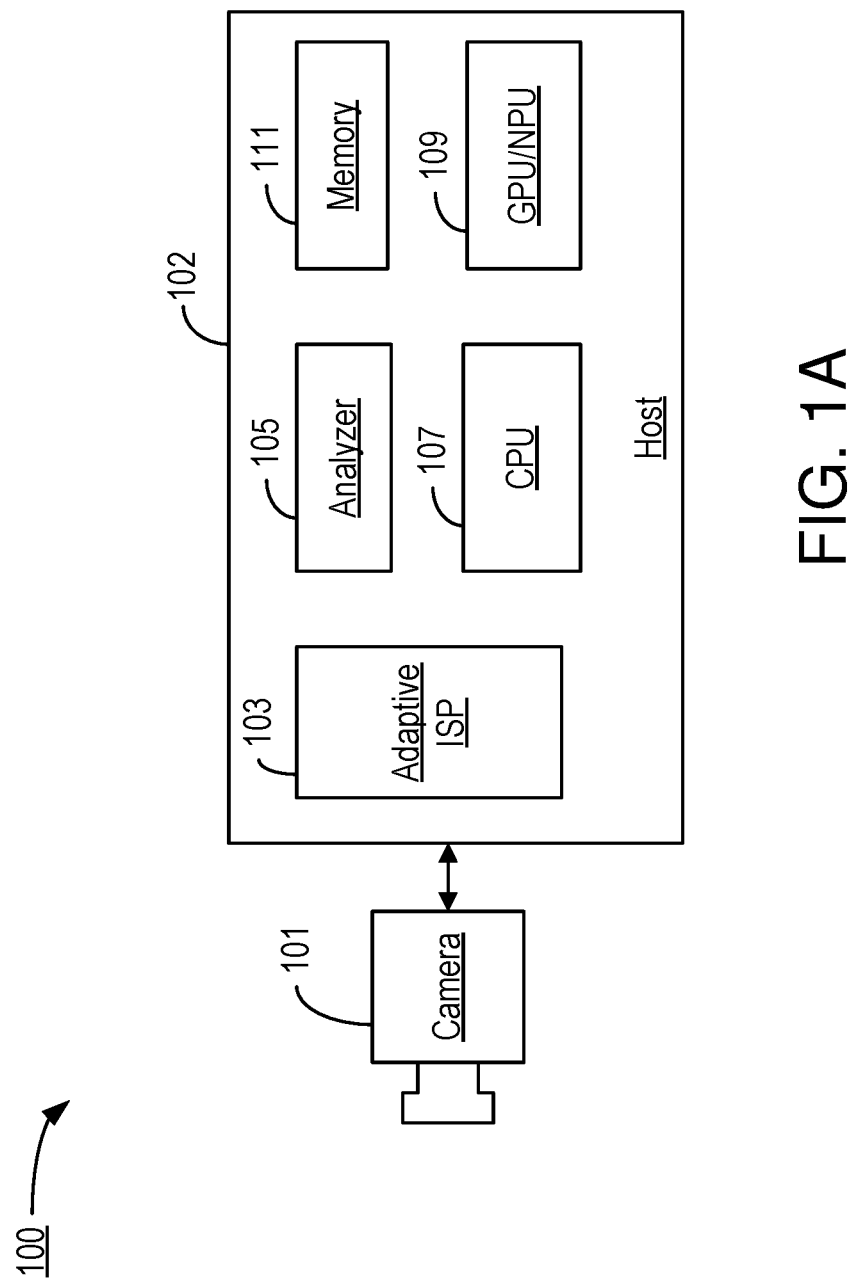
FIG. 1A is a block diagram of an exemplary embodiment low-power object detection/identification system for authorizing a device action.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology involves a low-power object detection/identification system for recognizing the presence of a particular object or person and taking some action in response. Such actions include, without limitation, any one or more of opening or activating locked items or devices, or taking some other default, pre-configured, or user/system-configured action(s). An aspect of the technology that contributes to low-power consumption is employment of step-based decision making, in which some but not all camera sensing structures (e.g., select groups of pixel elements) are activated to generate a sensed image from which an initial decision is made whether the detected object sufficiently matches a baseline model to warrant further expenditure of power to confirm that a match has been found. As used herein, the term "sensed image" refers broadly to the collection of outputs generated by the activated sensing structures, regardless of how they are organized in two-dimensional space. For example, the generated outputs need not be spatially related to one another in a matrix-like organization that would correspond to a bit-mapped image that a person would consider to be a picture.

In another aspect of the herein-described technology, the baseline model requires activation (e.g., supplying power to, or otherwise enabling a functional operation) of only a subset of a camera's color sensing capability so that only that subset performs a sensing function.

In yet another aspect of the herein-described technology, the camera that is used in low-power mode is also capable of full activation and is accordingly capable of being employed also in a more power-hungry process to confirm whether a detected object matches a more complete model of a known authorized object/user.

These and other aspects will now be described in greater detail in connection with the figures. Referring first to FIG. 1A, it is a block diagram of an exemplary embodiment low-power object detection/identification system 100 for authorizing performance of a device action. As non-limiting examples, such actions include:

opening an associated device;
closing an associated device;
locking an associated device;
unlocking an associated device;
activating an associated device;
deactivating an associated device;
starting an associated device;
stopping an associated device.

In each instance, the associated device is in some way associated with the system 100. There are many types of such associated devices and a complete list is beyond the scope of this description. Non-limiting examples include vehicle locking mechanisms (e.g., vehicle doors, vehicle engines); home locking systems; workplace locking systems; workplace entry authorization systems; secure area authorization systems; consumer appliance (including electronic device) start and stop functions; consumer device (including electronic device) activation/deactivation functions.

In one class of embodiments, extended reality (XR) glasses with an image sensor can be employed as a sensing device, and the system 100 configured to recognize when a particular user and/or object is within a line of sight of the XR glasses. It will further be recognized that opening/activating locked items or devices is but one example out of many possible examples and is for purposes of illustration. As mentioned before, other types of actions can be performed when the system 100 recognizes that a particular object or person is present, and all are contemplated to be within the scope of inventive embodiments.

The system 100 comprises a camera module 101 that can include a standard Red Green Blue (RGB) Camera Image Sensor (CIS). In alternative embodiments, cameras with different setups of color filters can instead be used if the use case is specific and only needs a specific set of colors. In yet other alternative embodiments, the camera module 101 can employ a monochrome camera using only one color or no color filter. In that case the threshold in the system (discussed later) would be a gradient of the specific color.

The camera module 101 is coupled to a host system 102 that includes an Image Signal Processor (ISP) 103 that controls the camera module 101 down to subsets of its sensing capability. These subsets are herein called "sensing structures" and can be different in different embodiments. As non-limiting examples, a "sensing structure" can be any of the following:

an individual pixel element
a row of pixel elements
a column of pixel elements
any arbitrary set of pixel elements selected from among all of the CIS's pixel elements.

The ISP 103 that controls the camera module 101 is, in some embodiments, custom made to have specific characteristics for a specific use case.

The host system 102 further includes an analyzer 105 that controls threshold levels that are used when deciding whether a sensed image sufficiently matches a given model. The analyzer 105 also decides what power level the system 100 should operate in.

The host system 102 also includes a central processing unit (CPU) 107 for general-purpose calculations.

The exemplary host system 102 also includes a Graphics Processing Unit (GPU)/Neural Processing Unit (NPU) 109 that is configured to run a neural network for detection and identification of sensed image features and compares these with one or more models of authorized objects/users. In addition, or as an alternative, identification can be accomplished by running state-of-the-art algorithms that are known to those of ordinary skill in the art.

The exemplary host system 102 also includes a memory 111 for storing things such as, but not limited to, neural network weights, images and other needed hardware and software features.

Figure 1B:
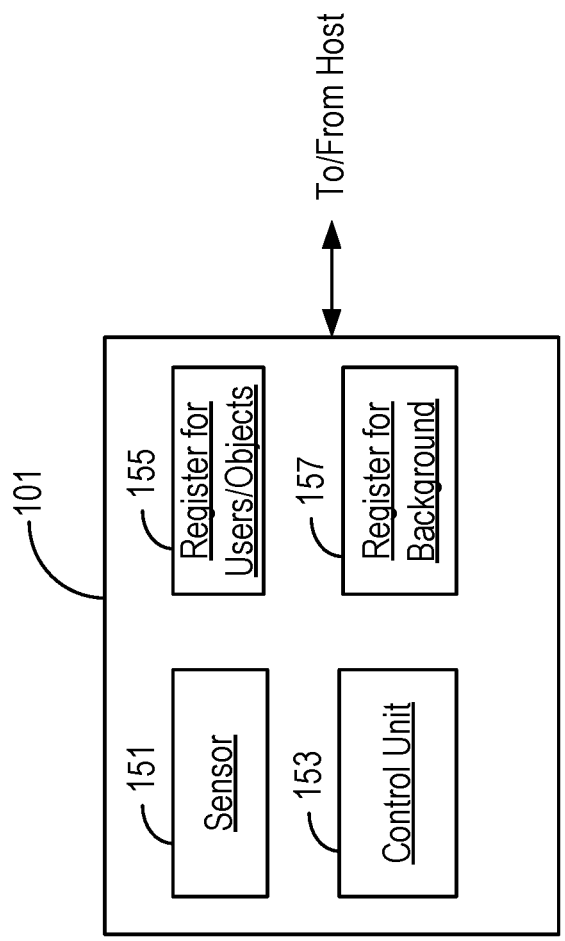
FIG. 1B is a more detailed block diagram of an embodiment of a camera module in some inventive embodiments.

Embodiments consistent with the invention are very well suited to applications in which a device authorization/activation process is performed in stages, with a lowest-power stage being performed by a camera module 101 configured such as in the exemplary embodiment illustrated in FIG. 1B. The camera module 101 comprises a sensor unit 151 comprising a plurality of sensing structures that are configurable as will be discussed further with reference to FIG. 3. the camera module 101 further comprises a control unit 153 for controlling the various components of the camera module 101 in a way that conforms with the various actions described herein.

In one respect, the camera module 101 is able to make an initial conclusion whether an object or person being presented to the sensor module 151 is one of one or more previously authorized objects/persons, and to facilitate this function the camera module 101 includes a register 155 for users/objects. As will be discussed further below, recognition of an object/person includes detecting whether a sufficient number of activated sensing structures are being triggered by the object/person being presented, and this means comparing the number of triggered sensing structures to a threshold. It is a purpose of the register 155 for users/objects to store settings for all of the objects/users that are available in a given model. There may be one or more than one such object/user.

The initial conclusion made by the camera module 101 should be understood as being a sufficiently close match (within a defined threshold) between the results of the sensed data and the data stored in the register 155 per user/object or version of user/object, and the like. The initial conclusion is not made with 100% certainty. But finding an initial match provides sufficient confidence to warrant engaging a higher power stage of analysis that can be used to further enhance the detection and security of the detection with additional sensors or pixels to give higher resolution and the like. By forming an initial conclusion as presented herein, the system is able to expend only minimal energy in order to avoid having non-matching conditions constantly wake up the higher power system. The ratio of negative detections will likely always be much higher than positive results, thus resulting in significant power savings.

In another respect, the camera module 101 is able to detect when no object/user is being presented to the sensor module 151 and to remain in a very low power state under such circumstances, and then to be able to revert to a more active state when something (object/person) is then presented to the sensor module 151. As will be described further below, this function involves tracking whether the sensor module 151 presently detects an image corresponding only to an image of an environmental background (i.e., an image without an object or person being presented to the sensor module 151). So long as only background is detected, the camera module 101 can remain in the very low power state. If a sufficient enough change to the scanned image is detected, the more active state is entered. To facilitate this purpose, the camera module 101 further includes a register 157 for a background image. It is a purpose of the register 157 for background to store settings for a background that is available in a given model.

FIG. 2 is a schematic/state diagram illustrating the concept of a multi-stage authorization/activation process.

Processing effort begins at a minimal level, depicted as the smallest circle in the left-most position in the diagram, which represents a lowest-power processing state 201. Embodiments consistent with the invention, such as but not limited to the exemplary system 100 of FIG. 1, perform the processing of at least state 201. A baseline model selects a first number of sensing structures of the camera image sensor 151, with the number being less than a total number of sensing structures of the camera image sensor 151. The baseline model is the set of reference values to which the sensor data is compared to determine whether or not there is a positive ID. The baseline model is configured to detect a very small number of key image features that would be expected to be found in an image of an authorized object/user, and the first number of sensing structures is selected to be able to detect this small number of key image features.

If the features are not found in the sensed image ("Fail") then further testing, and its consequent greater expenditure of energy, is avoided.

But if the features are found from this sensing ("Pass"), authorization has passed this first stage of testing, and testing moves on to a next state 203 in which a larger number, but depending on embodiment perhaps still not the total number, of sensing structures are activated to detect a match between a sensed image and a model, this time at a higher level of granularity. A failure to match at this level can cause the processing to revert to the initial lowest-power state 201. But a "pass" allows still further testing, and further power to be expended, to ensure that the match is accurate.

The number of stages performed before a final conclusion is reached is implementation dependent. In the non-limiting example of FIG. 2, four states 201, 203, 205, and 207 are shown. But in other embodiments there could be more or fewer states, each associated with a different amount of processing effort to detect whether a sensed image matches a model of an authorized object/user. An advantage of this multi-stage testing arrangement is that, at the conclusion of processing, the system is able to detect, with as little energy consumption as possible, whether a known object/user has been identified, and this reduction in energy consumption enables the system to employ an always-on camera.

Figure 3:
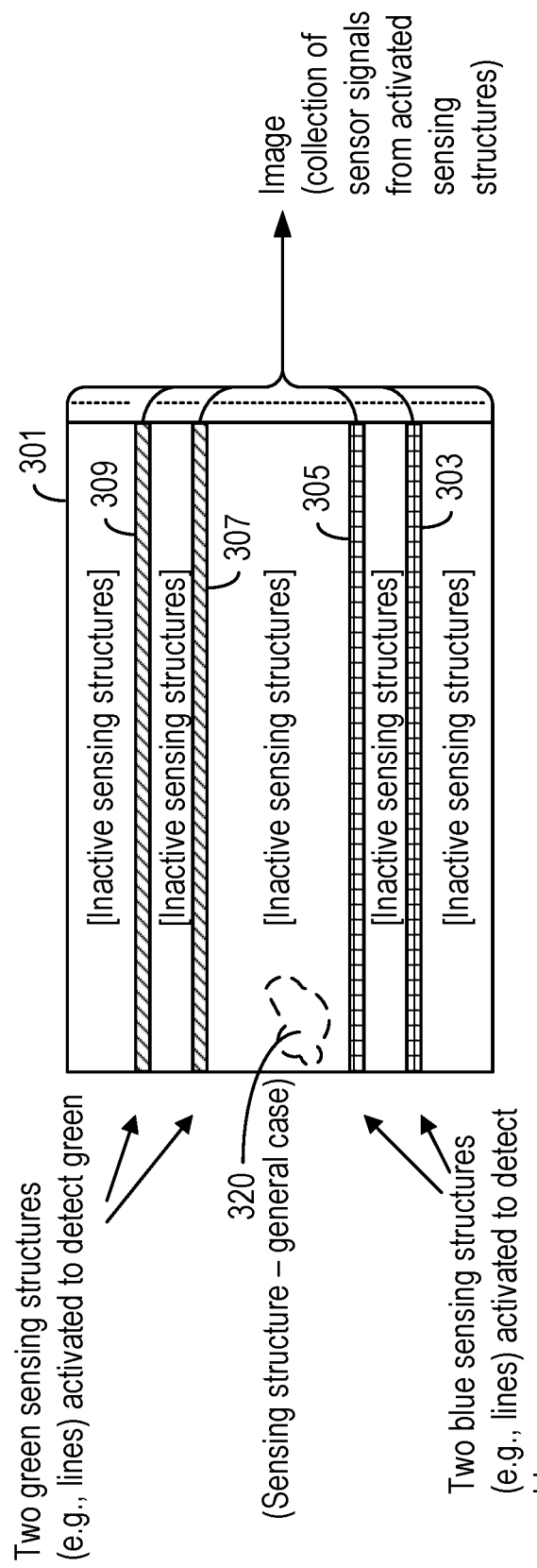
FIG. 3 is a schematic depiction of an exemplary array of sensing structures.

To illustrate the power consumption aspect, consider an example shown in FIG. 3 in which an 8 megapixel (MP) camera having an array 301 of 3264×2448 pixel elements consuming about 100 mW is used as the camera module 101. For purposes of this example, it is assumed that each pixel consumes the same amount of energy. Assuming one color and one row we get (only half of the pixels in a row have one color) 1632/8000000*100→0.0002 mW per row→0.2 uW per row and color. The sensor usually has 10-14 bit raw sensor bit depth, but this could be quantized to minimize the power consumption. It could also be that the A/D converter in the camera in low power mode could be one bit and it will be the trigger signal itself.

In some but not necessarily all embodiments, the lowest level of power is advantageously handled in the camera module 101 itself. Self-contained hardware embodiments of the camera module 101 can be configured for this purpose in order to enable a low-power, always-on embodiment. Based on the baseline signature a few lines of the CIS 151 will be active. For example, suppose a user has a green shirt and blue trousers at the time of using the system 100. The system 100 adds these important colors to the model during a model updating phase of processing. When entering the lowest power level the system, the camera module 101 is activated accordingly. In this case with the green shirt and blue trousers; green pixels in a few rows are activated at the top of the CIS 151 (above the center of the vertical field of view for example) and blue pixels are activated in the bottom of the CIS 151 (below the center of the vertical field of view for example). The pixel rows that are active indicate a triggering event once a threshold of pixel value is found. The algorithm used to analyze the selected set of pixels is also robust enough to manage a range of values that can identify a certain pattern but with alignment towards the sensor somewhat askew. In the example It can be one of many situations affecting the intensity of certain colors for example slightly lower, to the side or further away. This could be done on sensor level of the camera module 101 or in the ISP 103 running in low power mode.

It will be noted that the use of the colors green and blue in the above example are for purposes of illustration only, and are non-limiting. Any colors (e.g. red, purple, orange, brown, black or white etc.) could have been used in the example, and the aspects illustrated in the exemplary embodiment would still hold, with pixel rows being selected for activation based on the extent to which they sense color components of the object's color(s).

In the example of FIG. 3, a "sensing structure" is considered to be a row of pixels, and four of these are shown in an activated state: a first sensing structure 303 for detecting blue; a second sensing structure 305, also for detecting blue; a third sensing structure 307 for detecting green; and a fourth sensing structure 309, also for detecting green. Again, these selections are for purposes of illustration only; there is no particular significance to the number of illustrated sensing structures, their locations or orientations within the array 301, the particular colors being sensed, or even the fact that pixels are selected to form a contiguous portion (e.g., a row) of the array 301. To highlight this point, the schematically depicted sensing structure 320 is included in the figure to represent sensing structures in the "general case".

Remaining sensing structures illustrated in FIG. 3 are, in the illustration, inactive.

If an image obtained from the activated sensing structures 303, 305, 307, 309 passes a first round of testing against a model, then a next level of identification could, for purposes of example, be that ⅔ of the Vertical Field of View (VFOV) starting at the top looks at green and ⅔ of the VFOV starting from the bottom looks at blue. The question being asked could be, for example, is it possible to identify a green shirt and blue trousers? If yes and the image obtained from the further activated sensing structures sufficiently matches this level's model, then processing moves on to a next power level; otherwise processing reverts back to an adaptive identification sleep mode. The identification processing can be performed by the neural processing unit 109 and the analyzer 105 can be used to decide whether testing at the next power level should be activated or instead whether the current (higher) power level should be deactivated based on the result of the neural network.

To take the example further, a third level of testing can be that the full FOV is activated with all colors but at a lower resolution, for example 1 MP instead of 8 MP (if that is the maximum resolution of the camera module 101). The image is again sent to the neural processing unit 109 and the analyzer 105, this time with a different set of weights.

Testing can, for example, look to see whether a person and a face can be recognized; if so, the analyzer 105 will decide to go to the next power level.

To take the example still further, if a fourth power level of testing is reached, an image with full 8 MP resolution will be taken. The ISP 103 will crop the face and/or other biometrical attributes and send the information to the neural processing unit 109 and the analyzer 105 for identification. If the imaged person is identified as a user, the item or device will be triggered to open/unlock depending on the use case.

To handle the case in which, at a certain point the user has changed appearance from the baseline (e.g., is no longer wearing a green shirt and blue trousers) and is not recognizable at the lowest level of testing using the most-recent (but now outdated) model, the full system can be further configured to turn on and provide the image to a more capable processor for identification/analysis. The more capable processor can be configured to be nearby the camera module 103 (e.g., disposed within the host system 102 as illustrated in FIG. 1A), or alternatively it can be a central computing resource (e.g., server, mobile edge cloud, etc.). The design choice of how to configure any particular embodiment depends on a number of factors, including whether the low-power system is to be a stand-alone system, or whether it is part of a larger system of sensors and gates—in the latter, an updated profile might need to be shared with the other sensor nodes. In the examples presented herein for purposes of illustrating aspects of inventive embodiments, a local application processor is assumed, since it would be the natural system implementation (there should be a CPU with an ISP and some image processing in the form of accelerator/GPU/NPU). But it will be noted that, for example, the final one or two steps 205, 207 of processing (see FIG. 2) can be performed in a system that is not local to the system 100, so that communication between the sensor system and the more capable device is needed.

The change from one of the power-saving states to the full system being on can be done from any of the power levels. One trigger of this could be that when a person stands sufficiently close to the associated device (e.g., car), at least a certain amount of horizontal pixels will be filled and that will trigger the full system. Other triggers are also possible.

Further aspects of embodiments consistent with the invention will now be described with reference to FIG. 4, which in one respect is a flowchart of actions performed by the system 100 in accordance with a number of embodiments. In other respects, the blocks depicted in FIG. 4 can also be considered to represent means 400 (e.g., hardwired or programmable circuitry or other processing means) for carrying out the described actions.

Before the system 100 can recognize a particular object/user, it must first perform initializing actions that include taking baseline measurements (step 401) of the object/user and calculating what sensor settings (e.g., which sensing structures 320 should be activated) for lowest power mode recognition of a particular object/user (step 403). At the conclusion of the initializing actions, the system 100 is ready to recognize the particular object/user when that object/user is detectable by the camera module 103.

During operation, the system 100 is in an adaptive identification sleep mode (step 405) that consumes a lowest amount of energy. The system 100 can be configured to detect when an object/user is being presented to the camera module 101 and in response to the detection, to use a previously generated baseline model of an authorized object/user to select and activate a lowest number of sensing structures 320. Alternatively, the system 100 can be configured to be always-on with a lowest number of sensing structures 320 always selected and activated so that an authorized object/user can be immediately recognized when presented to the camera module 101. In this alternative, there is no need to detect that an object/user has come within view of the camera module 101.

In a scanning step 407, signals from the active sensing structures 320 are compared with the baseline model (e.g., by comparing the strength of the signals to a threshold) (decision block 409). If the comparison fails ("No" path out of decision block 409) then the system 100 remains in the lowest power state and processing in some embodiments reverts back to step 407.

Looping between steps 407 and 409 when the system fails to recognize a particular object/person is consistent with low-power, always-on operation and may be sufficient in some use cases. In some but not necessarily all embodiments, the system 100 can be further configured to handle situations in which an object or user that should be recognized is, for some reason, not recognized. To avoid endless looping, the system 100 can be further configured to include a mechanism that allows the user to override the low power operation and force the system to transition to a higher-power analysis that would then more accurately decide whether the object/person is recognized. For example, as shown in FIG. 4, upon failing to recognize the object/user at decision block 409, the system 100 can test to determine whether an override operation has been triggered (decision block 410). An override operation can be triggered by an action such as the user pressing a button, or gripping a doorknob. The particular form of such triggering is not essential to inventive embodiments. If no override is detected ("No" path out of decision block 410), then processing continues to step 407 as discussed above. But if an override has been triggered ("Yes" path out of decision block 410), then higher level processing is invoked to provide a more reliable (and more power consuming) analysis. In some embodiments, this involves sending information about the failed scan to a host system 102 or other higher level processor for analysis (step 411), the host system (or other) processor performing the higher level analysis (step 413) and performing another test against a threshold (decision block 415). If this test passes ("Yes" path out of decision block 415) then the object/user is considered to be identified (step 417). Further actions, triggered by the recognition, can then be performed. But if this test fails ("No" path out of decision block 415), the object/person was not recognized and the system 100 can revert to its adaptive identification sleep mode (step 405).

Referring back now to decision block 409, step 419 is reached if the initial comparison of the signals from the active sensing structures 320 with the baseline model passed ("Yes" path out of decision block 409). Successfully passing the lowest level testing means that the system is now willing to expend more energy to determine with greater accuracy whether the object/user presented to the camera module 101 is actually an authorized object/user. Accordingly, a next (increased) number of sensing structures 320 is activated (step 419), a comparison of the activated sensor signals with a baseline measurement is made (step 423) (e.g., by processing elements of the host system 102), and the comparison result is compared with a predetermined threshold value (decision block 425). If the comparison result is greater than or equal to the predetermined threshold value ("Yes" path out of decision block 425) the object/person was again recognized by this next level of processing, so to provide even greater accuracy processing continues to step 411 and further actions are taken as described above. As previously discussed, this involves performing an even higher-level analysis by the host system 102 or other processing system that is more capable but also more energy demanding than what is done in the camera module 101.

If the comparison result is lower than the predetermined threshold value ("No" path out of decision block 425) then the higher number of activated sensors are deactivated (step 427). At this point, actions may further include adjusting the predetermined threshold value and/or other hysteresis-related parameters), deactivating the host system 102 (if it had been activated) and returning to a lowest level of energy consumption operation at step 407.

Figure 4:
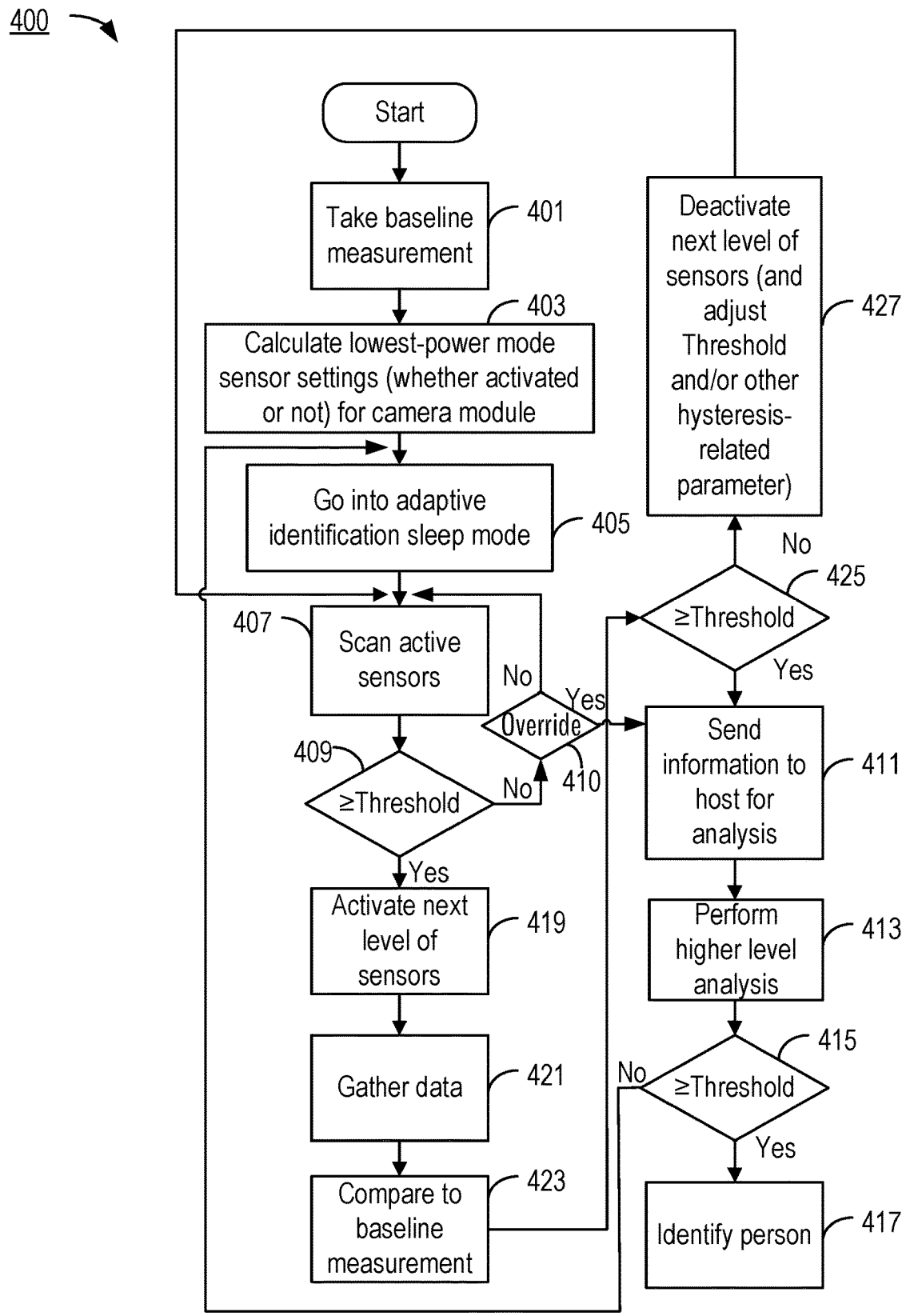
FIG. 4 is, in one respect, a flowchart of actions performed by a system in accordance with a number of embodiments consistent with the invention.

The exemplary embodiment of FIG. 4 illustrated three increasingly power consuming levels of analysis. However, other embodiments could differ, for example using only two levels or using more than three levels.

Further aspects of embodiments consistent with the invention will now be described with reference to FIG. 5 which, in one respect, is a flowchart of actions taken by the system 100 in accordance with a number of embodiments. In other respects, the blocks depicted in FIG. 5 can also be considered to represent means 500 (e.g., hardwired or programmable circuitry or other processing means) for carrying out the described actions.

Figure 5:
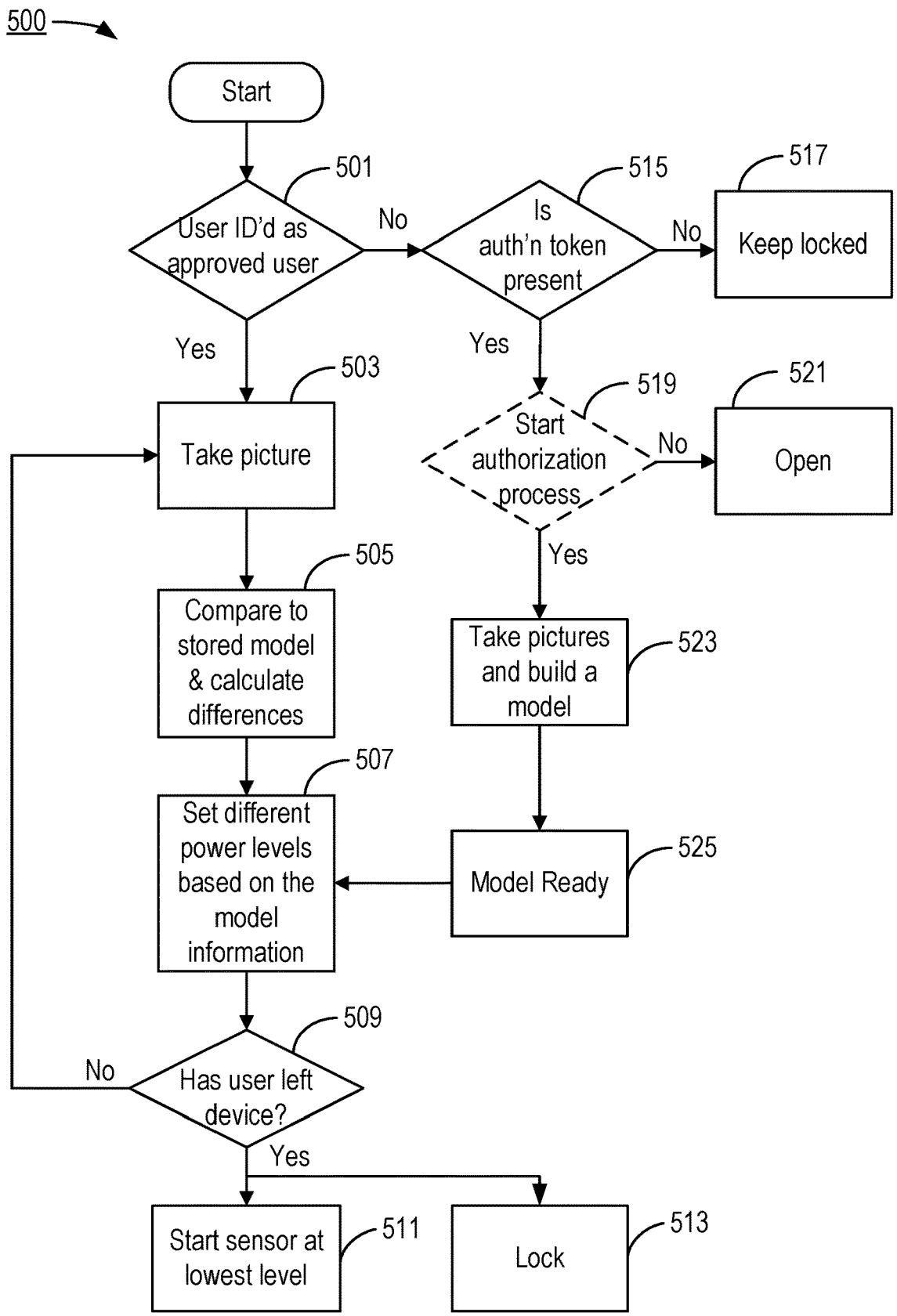
FIG. 5 is, in one respect, a flowchart of actions performed by a system in accordance with a number of embodiments consistent with the invention.

The focus in FIG. 5 are actions taken as part of system initialization. As mentioned above, during operation the system 100 relies on one or more baseline models which specify key image features that should be looked for during each stage of authorization processing. FIG. 5 focuses on aspects relating to the creation and updating of a baseline model.

An initial test decides whether the camera module 101 is presently imaging an object/user that it has decided is an approved object/user (decision block 501). This decision can be made by, for example, taking actions such as those described above with respect to FIG. 4.

If the system 100 detects that it is imaging an approved object/user ("Yes" path out of decision block 501) this means that a baseline model for that object/user already exists. The question is whether it should be updated to take into account a changed appearance of the object/user. Accordingly, a picture of the object/user is obtained (e.g., a high resolution image) (step 503) and features from the obtained image are compared with corresponding features of the stored model to produce a set of calculated differences and the model is updated accordingly (step 505). Predefined threshold levels that are used during the authorization process (e.g., refer to FIG. 4) at different power levels are adapted based on the updated information (step 507) and these are stored as well.

So long as the object/user remains in front of the camera ("No" path out of decision block 509), the system 100 can continue to take more pictures and update the model accordingly, although this is not an essential aspect of this feature.

Once the object/user is no longer in front of the camera module 101 ("Yes" path out of decision block 509), the model has been updated and system operation begins at the lowest energy consumption level (step 511). A device associated with the system 100 is also put into a locked/deactivated state (step 513).

Returning to decision block 501, if the object/user presently in front of the camera module 101 is not recognized as an approved object/user ("No" path out of decision block 501) then the question is whether this object/user is an authorized one for which a baseline model should be created. One way of testing this is detecting whether an authorization token is being presented to the system (decision block 515). If not ("No" path out of decision block 515) then the device associated with the system 100 should be maintained in a locked/deactivated state (step 517).

But if a valid authorization token is presented to the system 100 ("Yes" path out of decision block 515) then there can be an optional step to further determine whether this is an appropriate time to build a model (decision block 519). If not ("No" path out of decision block 519), then the object/user has been authorized (i.e., by means of an authorization token) and the device associated with the system 100 should be activated/opened (step 521).

If a baseline model should be built at this time ("Yes" path out of decision block 519), then some number of pictures (the exact number depends on the particular algorithm being used) are taken of the object/user, important features extracted from those pictures, and the resultant model (e.g., a two- or three-dimensional model) built (step 523). It is advantageous to calculate the model using a higher-level (e.g., highest level) processing capability, since model building is a power- and processing-intensive activity. The model is then stored so that it can be ready for use (step 525) and processing proceeds to step 507 in which parameters of the system 100 are initialized for use at each of the different power levels. Further processing continues as already described above.

Models that can be used with the invention can be based on a number of different image aspects, and not all models need to represent the same aspects. In some but not necessarily all models, a three-dimensional representation of an object/user is made. With respect to a person, the model can for example include characteristics such as size, height, postures, and the like. Model updates can take into account such things as new clothing, glasses, and the like.

The system 100 can also keep track of characteristics over time so for example if the user is wearing sunglasses when leaving the system 100 and is not wearing them when he or she returns the model can include features from both possibilities so that it remains usable under different circumstances. The number of parallel features that can be stored to a model is adaptive and can be set by the user or manufacturer based on memory requirements, number of users and the like.

In another aspect, the baseline model contains the current user profile and all other profiles that are included in the system 100.

Figure 6:
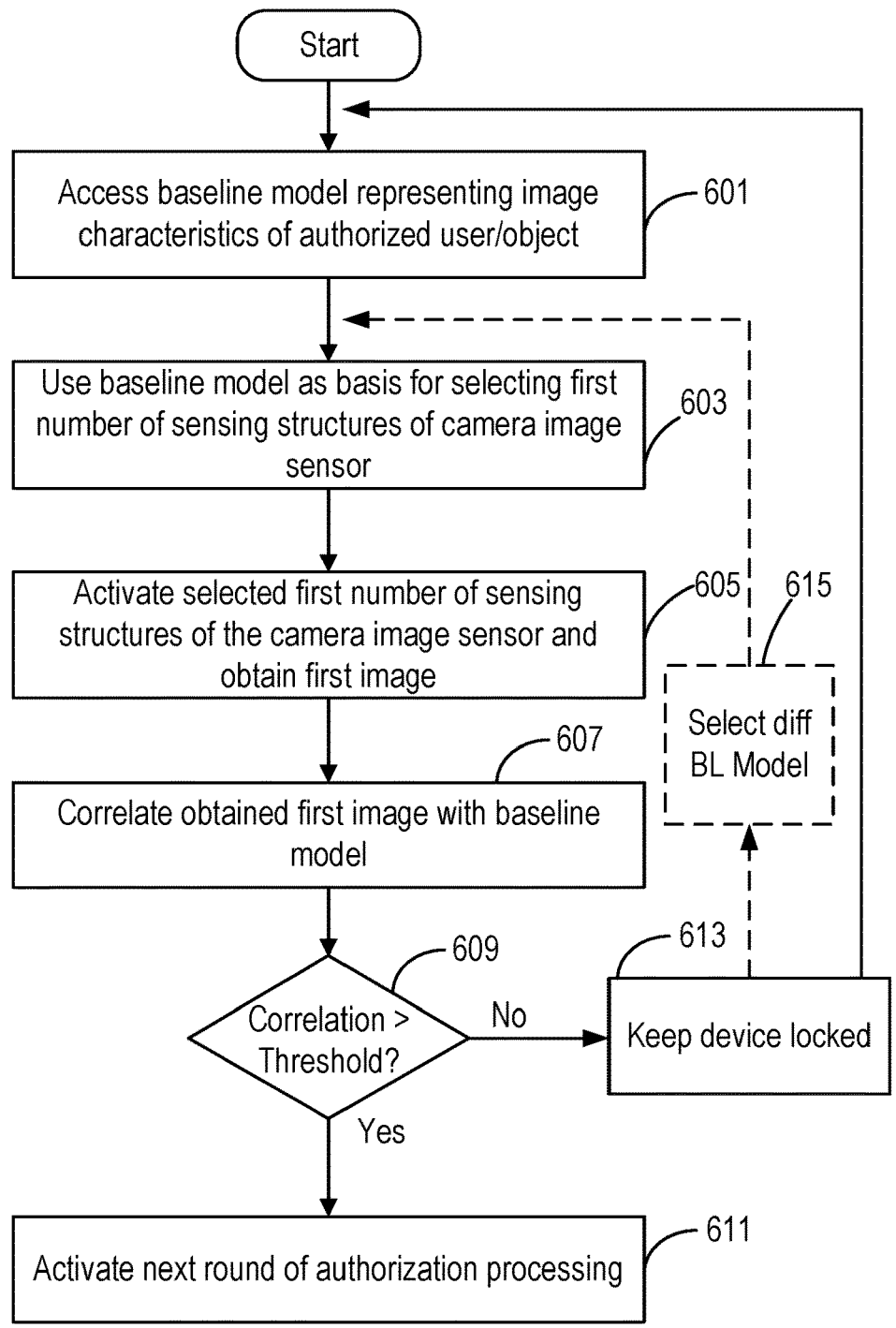
FIG. 6 depicts is, in one respect, a flowchart of actions performed by a system in accordance with a number of embodiments consistent with the invention.

To further facilitate an understanding of aspects of embodiments that are consistent with the invention, features are now described with reference to FIG. 6 which, in one respect, is a flowchart of actions taken by the system 100 in accordance with a number of embodiments. In other respects, the blocks depicted in FIG. 6 can also be considered to represent means 600 (e.g., hardwired or programmable circuitry or other processing means) for carrying out the described actions in order to authorize activation of, for example, devices associated with (e.g., by means of proximity) the system 100.

To perform the authorization, the system 100 accesses a first baseline model that represents image characteristics of an authorized first user or object (step 601). The first baseline model is used as a basis for selecting a first number of sensing structures of a camera image sensor (step 603), wherein the first number of sensing structures 320 of the camera image sensor 101 is less than a total number of sensing structures 320 of the camera image sensor 101.

The selected first number of sensing structures 320 of the camera image sensor 101 is activated and a first image sensed by the activated first number of sensing structures is thereby obtained (step 605).

The first image is compared with the first baseline model (step 607), and based on the comparison (decision block 609), a next round of authorization processing is activated (step 611) when an amount of correlation between the first image and the first baseline model satisfies a threshold correlation amount ("Yes" path out of decision block 609). Otherwise ("No" path out of decision block 609), the device associated with the system 100 is maintained in a deactivated/locked state (step 613). Processing then can revert back to step 603 to repeat the process.

In an aspect of some but not necessarily all embodiments, the system 100 can be configured to recognize more than one object/user as an authorized object/user. In some embodiments, this is achieved by, after failing to find a match with a first baseline model, a different baseline model (i.e., one associated with a different object/user) is selected (step 615) and the process is repeated but this time using two different baseline model.

Another aspect of some but not necessarily all embodiments consistent with the invention involves what to do when no object/user is presented to the camera module 101. In such instances, the camera module 101 will merely sense what is considered to be a background image. This situation can be used to detect when an object/user finally appears. At a high level, the strategy is to perform low-level detection as described above. However, the device activation/deactivation decisions are the reverse: so long as a sensed image matches a model of a background image, the device is maintained in a deactivated/unlocked state. When the sensed image ceases to match the model of the background image, it can be concluded that an object/user has presented itself to the camera module 101, so the system 100 should swap out threshold settings associated with the background image model for those associated with one of the authorized objects/users. To summarize this aspect of embodiments consistent with the invention:

- a baseline model is loaded that represents image characteristics of a background that is sensed when no authorized user or object is present;
- the baseline model is used as a basis for selecting a corresponding number of sensing structures 320 of the camera image sensor 151, wherein the number of selected sensing structures 320 of the camera image sensor 151 is less than the total number of sensing structures 320 of the camera image sensor 151;
- the selected number of sensing structures 320 of the camera image sensor 151 is activated and a corresponding image sensed by the activated number of sensing structures 320 is obtained;
- the obtained images compared with the background baseline model; and
- a next round of authorization processing that uses an activated number of sensing structures associated with an authorized objects/user is triggered when an amount of correlation between the obtained image and the background baseline model does not satisfy a threshold correlation amount.

Figure 7A:
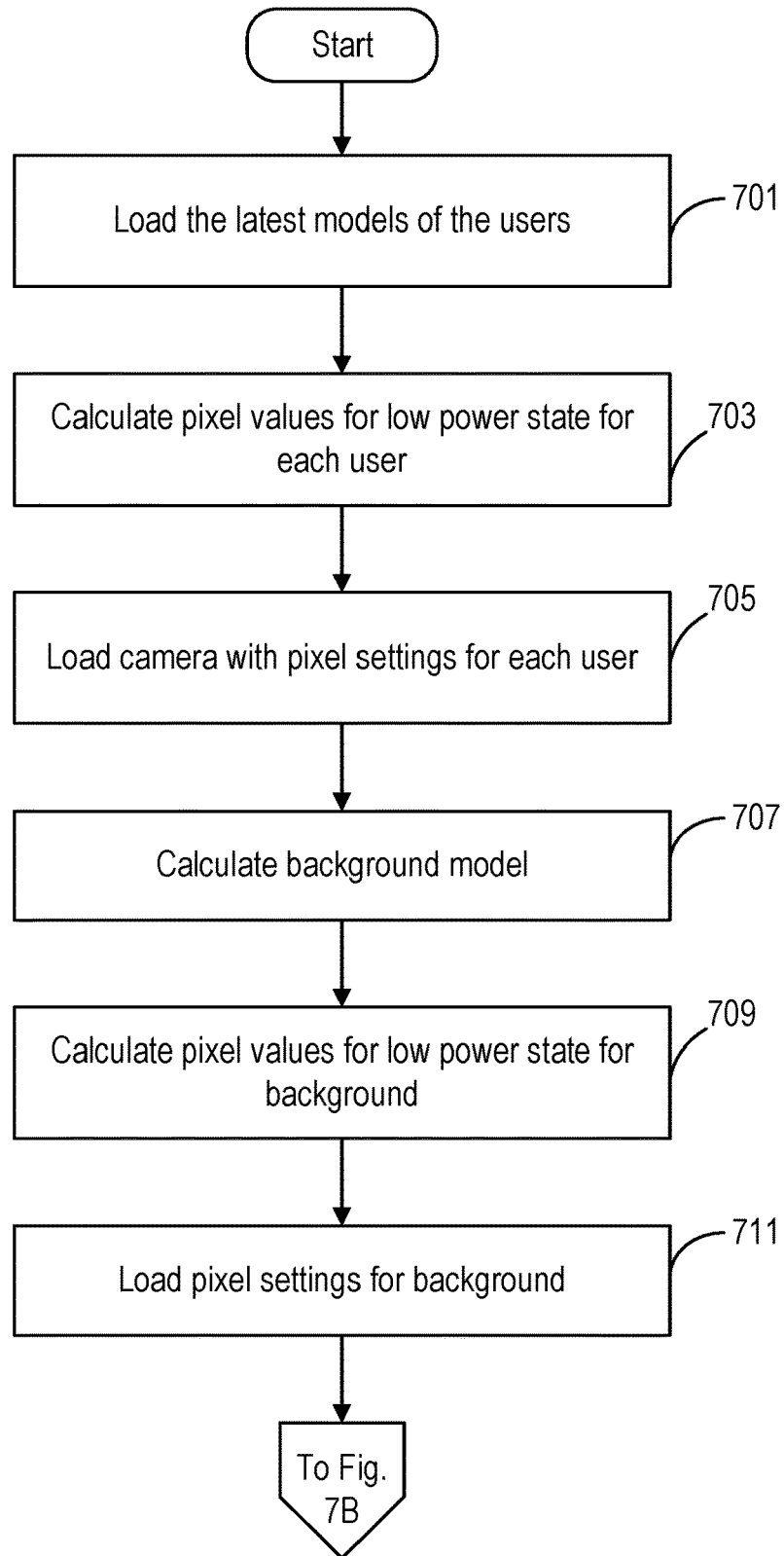
FIGS. 7A and 7B are, in one respect, a flowchart of actions performed by some embodiments consistent with the invention.
Figure 7B:
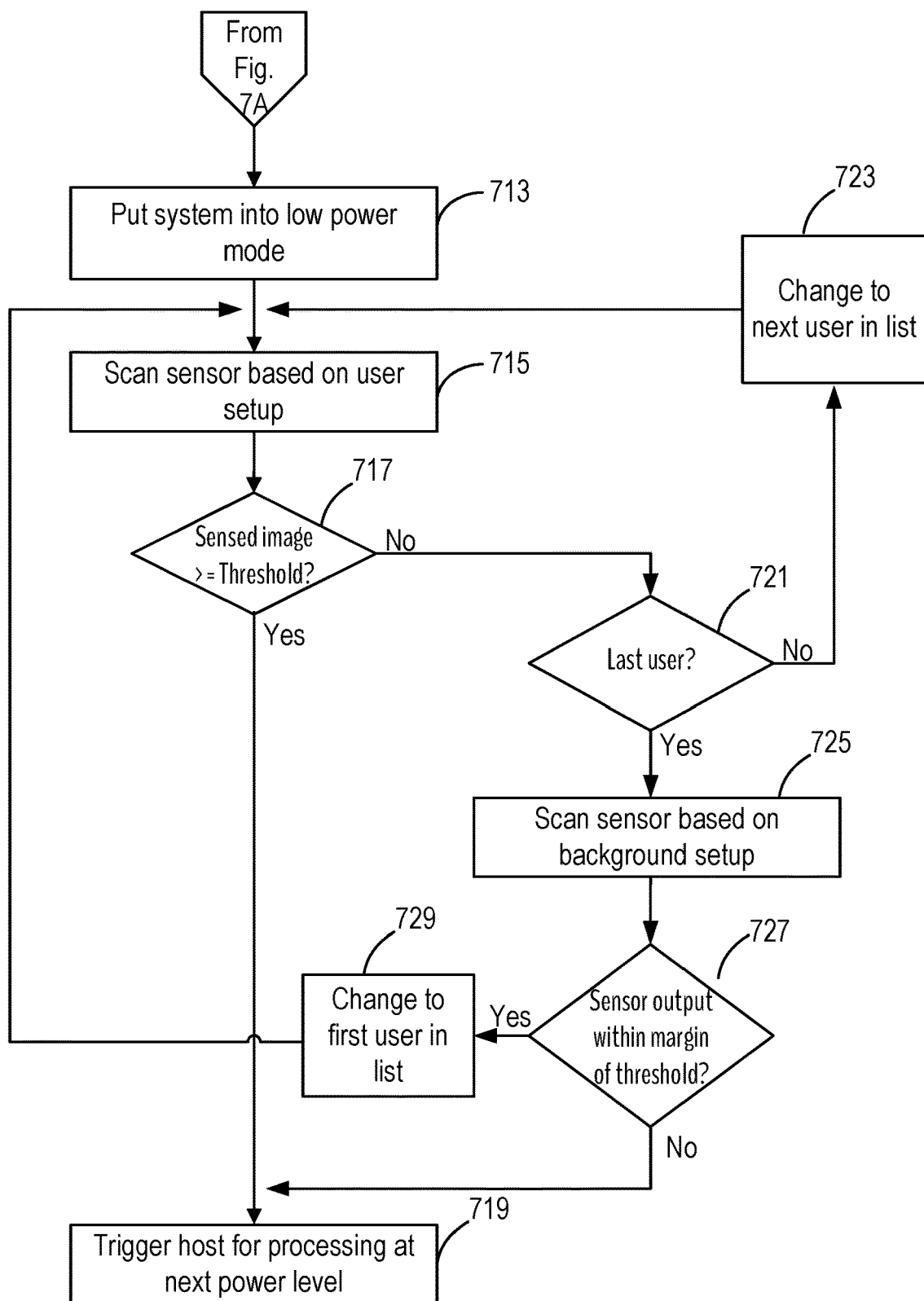

To further facilitate an understanding of these aspects of embodiments that are consistent with the invention, features are now described with reference to FIGS. 7A and 7B which, in one respect, are in combination a flowchart of actions taken by the system 100 in accordance with a number of embodiments. In other respects, the blocks depicted in FIGS. 7A and 7B can also be considered to represent means 700 (e.g., hardwired or programmable circuitry or other processing means) for carrying out the described actions in order to authorize activation of, for example, devices associated with (e.g., by means of proximity) the system 100.

The strategy adopted in the illustrated embodiment involves, loading the one or more latest models of known users (step 701) and for each user, calculating pixel values that will be used in the low power state (step 703). Before the low power mode of the camera module 101 is activated, the calculated settings are loaded into the user/object register 155 (step 705), and these loaded settings will set the thresholds for all colors and the number of rows that are active for each user. The user/object register 155 has room for at least one user.

After the setting(s) for all users are set, the model for the background is put in place. The background model is calculated (step 707) every time just before the low power mode of the sensor is activated. From the background model, pixel values and thresholds for colors and number of sensing structures 320 (e.g., rows of pixels) that will be actively scanned are calculated (step 709) and loaded into the background register 157 (step 711).

Once all users and background models are set the sensor goes into low power mode (step 713). In low power mode each user setting is scanned one after another and in the last step the background setting is scanned. If the signal from the sensor is over or under a set threshold a trigger is sent to the host.

More particularly, the sensor 151, 301 is scanned based on the loaded user setup (step 715). The output from the sensor 301 is compared to the loaded threshold value (decision block 717), and if the comparison passes (e.g., is greater than or equal to the threshold) ("Yes" path out of decision block 717), then the host system 102 is triggered/activated (step 719) to further process a scanned image to decide, with better accuracy, whether the object/user presented at the sensor 301 is recognized. This higher level processing may, in some embodiments, comprise several levels of ever higher level processing, as described above.

If the output from the sensor 151, 301 does not pass the threshold test ("No" path out of decision block 717), processing determines whether the last object/user in the list of known objects/users has been checked (decision block 721). If not ("No" path out of decision block 721), settings for the next object/user in the list are loaded into the camera module 101 (step 723), processing reverts back to step 715 for further testing.

If the last user in the list has been checked without being recognized ("Yes" path out of decision block 721) The sensor is scanned using the loaded settings for the background (step 725). The strategy assumes that, so long as no object or person is presented to the camera module 101, it should be "seeing" only the background, and its output should accordingly be more or less constant over time (within some tolerance level, determined based on application). The strategy allows for some level of background deviation since, for example, people may be walking by the sensor without presenting themselves, lighting conditions can change over time, and the like. Therefore, with the background settings in effect, the sensor output is checked against its corresponding threshold level (decision block 727) to see whether or not it is stable. If the sensor output is within some predetermined margin of the threshold ("Yes" path out of decision block 727) then no significant change has been detected. To avoid the possibility that the system 100 might miss the appearance of an object or person being presented to the camera module 101, the effective system settings are changed to be those of the first user in the list (step 729) and processing reverts to step 715 and proceeds as discussed above.

It is desired to be able to recognize a known user even if there is some change in their appearance, for example, if the user has changed clothing or looks different in another way (e.g., changed hair color). Therefore, if the output of the camera module 101 is not within the margin of the threshold ("No" path out of decision block 727), the host system 102 is activated/triggered (step 719) to further process a scanned image to decide, with better accuracy, whether the object/user presented at the sensor 151, 301 is recognized. This higher level processing may, in some embodiments, comprise several levels of ever higher level processing, as described above. It is recognized that this may lead to more activations of the higher-power consuming system, but being able to recognize a user even when some changes in appearance have been made justify this action.

Figure 8:
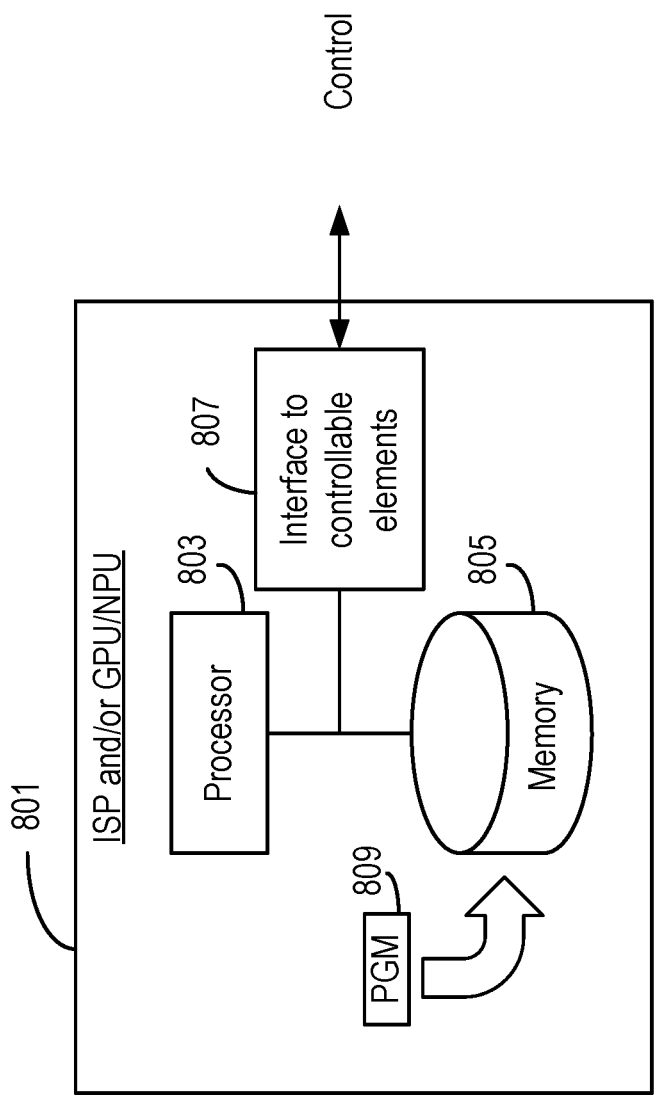
FIG. 8 is a block diagram of an exemplary controller of a system in accordance with some but not necessarily all exemplary embodiments consistent with the invention

Aspects of an exemplary controller that may be included in the system 100 to cause any and/or all of the above-described actions to be performed as discussed in the various embodiments are shown in FIG. 8, which illustrates an exemplary controller 801 of a system 100 in accordance with some but not necessarily all exemplary embodiments consistent with the invention. In particular, the controller 801 includes circuitry configured to carry out any one or any combination of the various functions described above. Such circuitry could, for example, be entirely hard-wired circuitry (e.g., one or more Application Specific Integrated Circuits— "ASICs"). Depicted in the exemplary embodiment of FIG. 7, however, is programmable circuitry, comprising a processor 803 coupled to one or more memory devices 805 (e.g., Random Access Memory, Magnetic Disc Drives, Optical Disk Drives, Read Only Memory, etc.) and to an interface 807 that enables bidirectional communication with other elements of the system 100 (e.g., camera module 101). The memory device(s) 805 store program means 809 (e.g., a set of processor instructions) configured to cause the processor 803 to control other system elements so as to carry out any of the aspects described above. The memory device (s) 805 may also store data (not shown) representing various constant and variable parameters as may be needed by the processor 803 and/or as may be generated when carrying out its functions such as those specified by the program means 809.

One use case in which the system 100 can be employed is in an automobile (e.g., for unlocking and locking doors, and/or unlocking and locking engine startup capability). Camera capability is already found as one of the main sensors in automobiles, and these will be used even more as sensors as the industry moves into autonomous driving. Multiple sensors can be configured together in a solution such as the one described herein, but the hardware would then need to be able to run multiple sensors and know when to hand over from one sensor to another and back; this presents a more complex task. Neural network models would need to be adjusted to each sensor instead of needing only one type of data from one specific sensor.

The various embodiments consistent with the invention can be deployed in any number of forms and devices, such as, without limitation, an authorization device or a locking device. In another example, embodiments consistent with the invention can be deployed in a mobile communication device.

Embodiments consistent with the invention provide a number of advantages over conventional technology. In one aspect image-based device authorization/activation is achievable with less energy than in conventional technology. The technology needs only one hardware sensor to achieve full capability.

Even at a low level of power consumption, embodiments consistent with the invention are able to minimize false activation of the next power level by employing a clever adjustable sensor and object detection model.

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of authorizing a device action in an apparatus comprising a camera module and a host system, the method comprising:
in the camera module:
accessing a first baseline model that represents image characteristics of an authorized first user or object;
using the first baseline model as a basis for selecting a first number of sensing structures of a camera image sensor, wherein the first number of sensing structures of the camera image sensor is less than a total number of sensing structures of the camera image sensor;
activating the selected first number of sensing structures of the camera image sensor and obtaining therefrom a first image sensed by the activated first number of sensing structures; and
comparing the first image with the first baseline model; and
the method further comprising:
activating a next round of authorization processing in the host system when an amount of correlation between the first image and the first baseline model satisfies a threshold correlation amount;
when the amount of correlation between the first image and the first baseline model does not satisfy the threshold correlation amount, performing:
accessing a second baseline model that represents image characteristics of an authorized second user or object;
using the second baseline model as a basis for selecting a third number of sensing structures of the camera image sensor, wherein the third number of sensing structures of the camera image sensor is less than the total number of sensing structures of the camera image sensor;
activating the selected third number of sensing structures of the camera image sensor and obtaining therefrom a second image sensed by the activated second number of sensing structures;
comparing the second image with the second baseline model; and
activating the next round of authorization processing when an amount of correlation between the second image and the second baseline model satisfies the threshold correlation amount; and activating the next round of authorization processing in the host system when a change to the first image is detected; and the host system consuming a higher amount of power than the camera module.

2. The method of claim 1, wherein:

each one of the total number of sensing structures of the camera image sensor is a pixel element or a line of pixel elements; or each of the sensing structures of the camera image sensor is a monochromatic sensing line.

3. The method of claim 1, further comprising:

using the first baseline model as a basis for deciding which ones of the total number of sensing structures of the camera image sensor will be selected as the first number of sensing structures.

4. The method of claim 1, wherein the device action is one of:

locking a device;
unlocking the device;
starting a device; and
stopping a device.

5. A method of authorizing a device action in an apparatus comprising a camera module and a host system, the method comprising:

in the camera module:
accessing a first baseline model that represents image characteristics of an authorized first user or object;
using the first baseline model as a basis for selecting a first number of sensing structures of a camera image sensor, wherein the first number of sensing structures of the camera image sensor is less than a total number of sensing structures of the camera image sensor;
activating the selected first number of sensing structures of the camera image sensor and obtaining therefrom a first image sensed by the activated first number of sensing structures; and
comparing the first image with the first baseline model; and the method further comprising:
activating a next round of authorization processing in the host system when an amount of correlation between the first image and the first baseline model satisfies a threshold correlation amount
the host system consuming a higher amount of power than the camera module;

the method further comprising, in the camera module:
accessing a third baseline model that represents image characteristics of a background that is sensed when no authorized user or object is present; and
comparing the first image with the third baseline model; and the method further comprising:
activating the next round of authorization processing in the host system when a change to the first image is detected.

6. The method of claim 5, wherein:

each one of the total number of sensing structures of the camera image sensor is a pixel element or a line of pixel elements; or each of the sensing structures of the camera image sensor is a monochromatic sensing line.

7. The method of claim 5, further comprising:

using the first baseline model as a basis for deciding which ones of the total number of sensing structures of the camera image sensor will be selected as the first number of sensing structures.

8. The method of claim 5, wherein the device action is one of:

locking a device;
unlocking the device;
starting a device; and
stopping a device.

9. An electronic device for authorizing a device action, the electronic device comprising:

a camera module; and
a host system that consumes a higher amount of power than the camera module,
the camera module being configured to:
access a first baseline model that represents image characteristics of an authorized first user or object;
use the first baseline model as a basis for selecting a first number of sensing structures of a camera image sensor, wherein the first number of sensing structures of the camera image sensor is less than a total number of sensing structures of the camera image sensor;
activate the selected first number of sensing structures of the camera image sensor and to obtain therefrom a first image sensed by the activated first number of sensing structures; and
compare the first image with the first baseline model;
the electronic device being configured to:
activate a next round of authorization processing when an amount of correlation between the first image and the first baseline model satisfies a threshold correlation amount;
the electronic device further comprising circuitry configured to perform, when the amount of correlation between the first image and the first baseline model does not satisfy the threshold correlation amount:
accessing a second baseline model that represents image characteristics of an authorized second user or object;
using the second baseline model as a basis for selecting a third number of sensing structures of the camera image sensor, wherein the third number of sensing structures of the camera image sensor is less than the total number of sensing structures of the camera image sensor;
activating the selected third number of sensing structures of the camera image sensor and obtaining therefrom a second image sensed by the activated second number of sensing structures;
comparing the second image with the second baseline model; and
activating the next round of authorization processing when an amount of correlation between the second image and the second baseline model satisfies the threshold correlation amount.

10. The electronic device of claim 9, wherein:

each one of the total number of sensing structures of the camera image sensor is a pixel element or a line of pixel elements; or each of the sensing structures of the camera image sensor is a monochromatic sensing line.

11. The electronic device of claim 9, further comprising:

circuitry configured to use the first baseline model as a basis for deciding which ones of the total number of sensing structures of the camera image sensor will be selected as the first number of sensing structures.

12. The electronic device of claim 9, wherein the device action is one of:
locking a device;
unlocking the device;
starting a device; and
stopping a device.

13. The electronic device of claim 9, wherein the electronic device is an authorization device or a locking device.

14. The electronic device of claim 9, wherein the electronic device is a mobile communication device.

15. The electronic device of claim 9, wherein the electronic device is an extended reality device.

16. An electronic device for authorizing a device action, the electronic device comprising:
a camera module; and
a host system that consumes a higher amount of power than the camera module,
the camera module being configured to:
  access a first baseline model that represents image characteristics of an authorized first user or object;
  use the first baseline model as a basis for selecting a first number of sensing structures of a camera image sensor, wherein the first number of sensing structures of the camera image sensor is less than a total number of sensing structures of the camera image sensor;
  activate the selected first number of sensing structures of the camera image sensor and to obtain therefrom a first image sensed by the activated first number of sensing structures; and
  compare the first image with the first baseline model;
the electronic device being configured to:
  activate a next round of authorization processing when an amount of correlation between the first image and the first baseline model satisfies a threshold correlation amount;
the camera module is configured to:
  access a third baseline model that represents image characteristics of a background that is sensed when no authorized user or object is present; and
  compare the first image with the third baseline model; and
the electronic device is further configured to:
  activate the next round of authorization processing in the host system when a change to the first image is detected.

17. The electronic device of claim 16, wherein the electronic device is an authorization device or a locking device.

18. The electronic device of claim 16, wherein the electronic device is a mobile communication device.

19. The electronic device of claim 16, wherein the electronic device is an extended reality device.

20. The electronic device of claim 16, wherein:
each one of the total number of sensing structures of the camera image sensor is a pixel element or a line of pixel elements; or
each of the sensing structures of the camera image sensor is a monochromatic sensing line.

21. The electronic device of claim 16, further comprising:
circuitry configured to use the first baseline model as a basis for deciding which ones of the total number of sensing structures of the camera image sensor will be selected as the first number of sensing structures.

22. The electronic device of claim 16, wherein the device action is one of:
locking a device;
unlocking the device;
starting a device; and
stopping a device.

* * * * *